United States Patent
Damnjanovic et al.

(10) Patent No.: US 11,589,414 B2
(45) Date of Patent: Feb. 21, 2023

(54) LAYER 2 USER EQUIPMENT RELAY PROCEDURE

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US); Juan Montojo, San Diego, CA (US); Olufunmilola Omolade Awoniyi-Oteri, San Diego, CA (US); Iyab Issam Sakhnini, San Diego, CA (US); Sony Akkarakaran, Poway, CA (US); Shanyu Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/197,396

(22) Filed: Mar. 10, 2021

(65) Prior Publication Data
US 2021/0289584 A1 Sep. 16, 2021

Related U.S. Application Data

(60) Provisional application No. 62/988,835, filed on Mar. 12, 2020.

(51) Int. Cl.
*H04W 76/28* (2018.01)
*H04W 76/27* (2018.01)
(Continued)

(52) U.S. Cl.
CPC ........... *H04W 76/28* (2018.02); *H04W 24/08* (2013.01); *H04W 24/10* (2013.01); *H04W 76/14* (2018.02);
(Continued)

(58) Field of Classification Search
CPC ..... H04W 76/28; H04W 76/14; H04W 76/27; H04W 24/08; H04W 24/10; H04W 80/02; H04W 88/04; H04W 92/18
(Continued)

(56) References Cited

U.S. PATENT DOCUMENTS

| 2018/0084480 A1* | 3/2018 | Yasukawa | H04W 24/10 |
| 2018/0146507 A1* | 5/2018 | Tsuda | H04W 88/04 |

(Continued)

FOREIGN PATENT DOCUMENTS

| EP | 3286960 B1 * | 9/2019 | .......... H04W 68/005 |
| EP | 3639572 B1 * | 2/2022 | ........ H04W 52/0229 |

(Continued)

OTHER PUBLICATIONS

Huawei, et al., "DRX on PC5," 3GPP Draft, 3GPP TSG RAN WG2#97bis, R2-1703669, DRX on PC5, 3rd Generation Partnership Project (3GPP), Mobile Competence Centre, 650, Route Des Lucioles, F-06921, Sophia-Antipolis Cedex, France, vol. RAN WG2, No. Spokane, USA; Apr. 3, 2017- Apr. 7, 2017, Mar. 25, 2017 (Mar. 25, 2017), XP051254589, 3 pages, Retrieved from the Internet: URL: http://www.3gpp.org/ftp/tsg_ran/WG2_RL2/TSGR2_97bis/Docs/ [retrieved on Mar. 25, 2017] paragraph [03.2].

(Continued)

*Primary Examiner* — Mong-Thuy T Tran
(74) *Attorney, Agent, or Firm* — Harrity & Harrity, LLP

(57) ABSTRACT

Various aspects of the present disclosure generally relate to wireless communication. In some aspects, a remote user equipment may identify a relay UE that is operating in a connected discontinuous reception mode, wherein the relay UE and the remote UE are connected to a base station, wherein the relay UE is in a discontinuous reception mode on a first link with the base station and a discontinuous reception mode or an active mode on a sidelink with the (Continued)

remote UE, and wherein one or more links between two or more of the remote UE, the relay UE, or the base station are radio resource control configured by the base station; and transmit one or more layer-2 communications to, or receiving one or more layer-2 communications from, the base station via the relay UE. Numerous other aspects are provided.

30 Claims, 8 Drawing Sheets

(51) Int. Cl.
    *H04W 80/02*     (2009.01)
    *H04W 24/08*     (2009.01)
    *H04W 24/10*     (2009.01)
    *H04W 76/14*     (2018.01)
    *H04W 88/04*     (2009.01)
    *H04W 92/18*     (2009.01)

(52) U.S. Cl.
    CPC ........... *H04W 76/27* (2018.02); *H04W 80/02* (2013.01); *H04W 88/04* (2013.01); *H04W 92/18* (2013.01)

(58) Field of Classification Search
    USPC ......................................................... 370/329
    See application file for complete search history.

(56) References Cited

U.S. PATENT DOCUMENTS

| | | | | |
|---|---|---|---|---|
| 2019/0357177 | A1* | 11/2019 | Kuang | H04B 7/2606 |
| 2019/0373579 | A1* | 12/2019 | Nord | H04W 76/10 |
| 2020/0015192 | A1* | 1/2020 | Chun | H04W 76/10 |
| 2020/0120745 | A1* | 4/2020 | Yang | H04W 76/28 |
| 2020/0163005 | A1* | 5/2020 | Rao | H04W 8/24 |
| 2020/0163017 | A1* | 5/2020 | Priyanto | H04W 52/0229 |
| 2020/0351965 | A1* | 11/2020 | Ugurlu | H04W 88/04 |
| 2022/0167268 | A1* | 5/2022 | Xu | H04W 72/0406 |

FOREIGN PATENT DOCUMENTS

| | | | | |
|---|---|---|---|---|
| EP | 3141076 B1 | * | 5/2022 | ........ H04W 52/0216 |
| GB | 2484347 A | | 4/2012 | |
| WO | WO-2016162852 A1 | | 10/2016 | |
| WO | WO-2017196611 A1 | * | 11/2017 | |

OTHER PUBLICATIONS

Huawei, et al., "Key Points on Sidelink Relay SID", 3GPP Draft, 3GPP TSG RAN Meeting #86, RP-192791, 3rd Generation Partnership Project (3GPP), Mobile Competence Centre, 650, Route Des Lucioles, F-06921, Sophia-Antipolis Cedex, France, vol. TSG RAN, No. Sitges, Spain, Dec. 9, 2019-Dec. 12, 2019, Dec. 2, 2019 (Dec. 2, 2019), XP051834383, 7 pages, Retrieved from the Internet: URL: https://ftp.3gpp.org/tsg_ran/TSG_RAN/TSGR_86/Docs/RP-192791.zip RP-192791.docx [retrieved on Dec. 2, 2019] p. 5, line 14—last line figure 3.

Huawei, et al., "Some Considerations About DRX on PC5", 3GPP Draft, 3GPP TSG RAN WG2#98, R2-1704718, Some Considerations about DRX on PC5, 3rd Generation Partnership Project (3GPP), Mobile Competence Centre, 650, Route Des Lucioles, F-06921, Sophia-Antipolis Cedex, France, vol. RAN WG2, No. Hangzhou, China; May 15, 2017-May 19, 2017, May 14, 2017 (May 14, 2017), XP051275256, 4 pages, Retrieved from the Internet: URL: http://www.3gpp.org/ftp/Meetings_3GPP_SYNC/RAN2/Docs/ [retrieved on May 14, 2017] p. 3, line 8-line 15.

International Search Report and Written Opinion—PCT/US2021/021830—ISA/EPO—dated Jun. 14, 2021.

* cited by examiner

LAYER 2 USER EQUIPMENT RELAY PROCEDURE

CROSS-REFERENCE TO RELATED APPLICATION

This patent application claims priority to U.S. Provisional Patent Application No. 62/988,835, filed on Mar. 12, 2020, entitled "LAYER 2 USER EQUIPMENT RELAY PROCEDURE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a layer 2 user equipment (UE) relay procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and the "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a remote user equipment (UE), may include identifying a relay UE that is operating in a connected discontinuous reception mode, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and transmitting one or more layer-2 communications to or receiving one or more layer-2 communications from the base station via the relay UE.

In some aspects, a method of wireless communication, performed by a relay UE, may include identifying, while in a connected discontinuous reception mode, a remote UE, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and relaying one or more layer-2 communications between the base station and the remote UE.

In some aspects, a method of wireless communication, performed by a base station (BS), may include identifying a remote UE and a relay UE that is operating in a connected discontinuous reception mode; configuring one or more links between two or more of the remote UE, the relay UE, or the BS based at least in part on identifying the remote UE and the relay UE, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and transmitting one or more layer-2 communications to or receiving one or more layer-2 communications from the remote UE via the relay UE based at least in part on configuring the one or more links.

In some aspects, a remote UE for wireless communication may include a memory and one or more processors coupled to the memory. The memory and the one or more processors may be configured to identify a relay UE that is operating in a connected discontinuous reception mode, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and transmit one or more layer-2 communications to or receiving one or more layer-2 communications from the base station via the relay UE.

In some aspects, a relay UE for wireless communication may include a memory and one or more processors coupled to the memory. The memory and the one or more processors may be configured to identify, while in a connected discontinuous reception mode, a remote UE, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and relay one or more layer-2 communications between the base station and the remote UE.

In some aspects, a BS for wireless communication may include a memory and one or more processors coupled to the memory. The memory and the one or more processors may be configured to identify a remote UE and a relay UE that is operating in a connected discontinuous reception mode, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; configure one or more links between two or more of the remote UE, the relay UE, or the BS based at least in part on identifying the remote UE and the relay UE; and transmit one or more layer-2 communications to or receiving one or more layer-2 communications from the remote UE via the relay UE based at least in part on configuring the one or more links.

In some aspects, a non-transitory computer-readable medium may store one or more instructions for wireless communication. The one or more instructions, when executed by one or more processors of a remote UE, may cause the one or more processors to identify a relay UE that is operating in a connected discontinuous reception mode, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and transmit one or more layer-2 communications to or receiving one or more layer-2 communications from the base station via the relay UE.

In some aspects, a non-transitory computer-readable medium may store one or more instructions for wireless communication. The one or more instructions, when executed by one or more processors of a relay UE, may cause the one or more processors to identify, while in a connected discontinuous reception mode, a remote UE, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and relay one or more layer-2 communications between the base station and the remote UE.

In some aspects, a non-transitory computer-readable medium may store one or more instructions for wireless communication. The one or more instructions, when executed by one or more processors of a BS, may cause the one or more processors to identify a remote UE and a relay UE that is operating in a connected discontinuous reception mode; configure one or more links between two or more of the remote UE, the relay UE, or the BS based at least in part on identifying the remote UE and the relay UE, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and transmit one or more layer-2 communications to or receiving one or more layer-2 communications from the remote UE via the relay UE based at least in part on configuring the one or more links.

In some aspects, an apparatus for wireless communication may include means for identifying a relay UE that is operating in a connected discontinuous reception mode, wherein the relay UE and the apparatus are connected to a base station, wherein the relay UE is in a discontinuous reception mode on a first link with the base station and a discontinuous reception mode or an active mode on a sidelink with the apparatus, and wherein one or more links between two or more of the apparatus, the relay UE, or the base station are radio resource control configured by the base station; and means for transmitting one or more layer-2 communications to or receiving one or more layer-2 communications from the base station via the relay UE.

In some aspects, an apparatus for wireless communication may include means for identifying, while in a connected discontinuous reception mode, a remote UE, wherein the apparatus and the remote UE are connected to a base station, wherein the apparatus is in a discontinuous reception mode on a first link with the base station and a discontinuous reception mode or an active mode on a sidelink with the remote UE, and wherein one or more links between two or more of the remote UE, the apparatus, or the base station are radio resource control configured by the base station; and means for relaying one or more layer-2 communications between the base station and the remote UE.

In some aspects, an apparatus for wireless communication may include means for identifying a remote UE and a relay UE that is operating in a connected discontinuous reception mode, wherein the relay UE is in a discontinuous reception mode on a first link with the apparatus and a discontinuous reception mode or an active mode on a sidelink with the remote UE, and wherein one or more links between two or more of the remote UE, the relay UE, or the apparatus are radio resource control configured by the apparatus; means for configuring one or more links between two or more of the remote UE, the relay UE, or the apparatus based at least in part on identifying the remote UE and the relay UE; and means for transmitting one or more layer-2 communications to or receiving one or more layer-2 communications from the remote UE via the relay UE based at least in part on configuring the one or more links.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
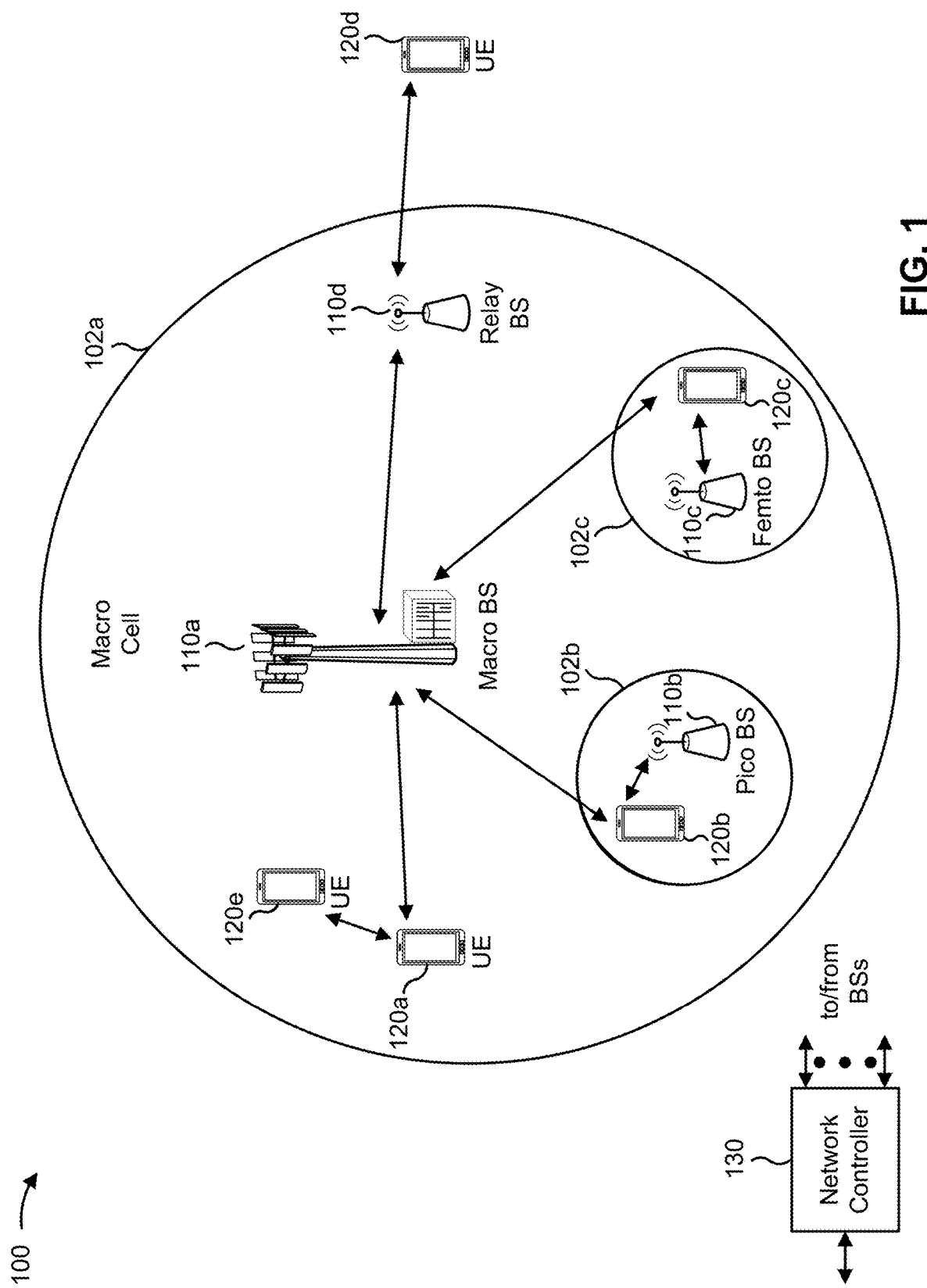
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
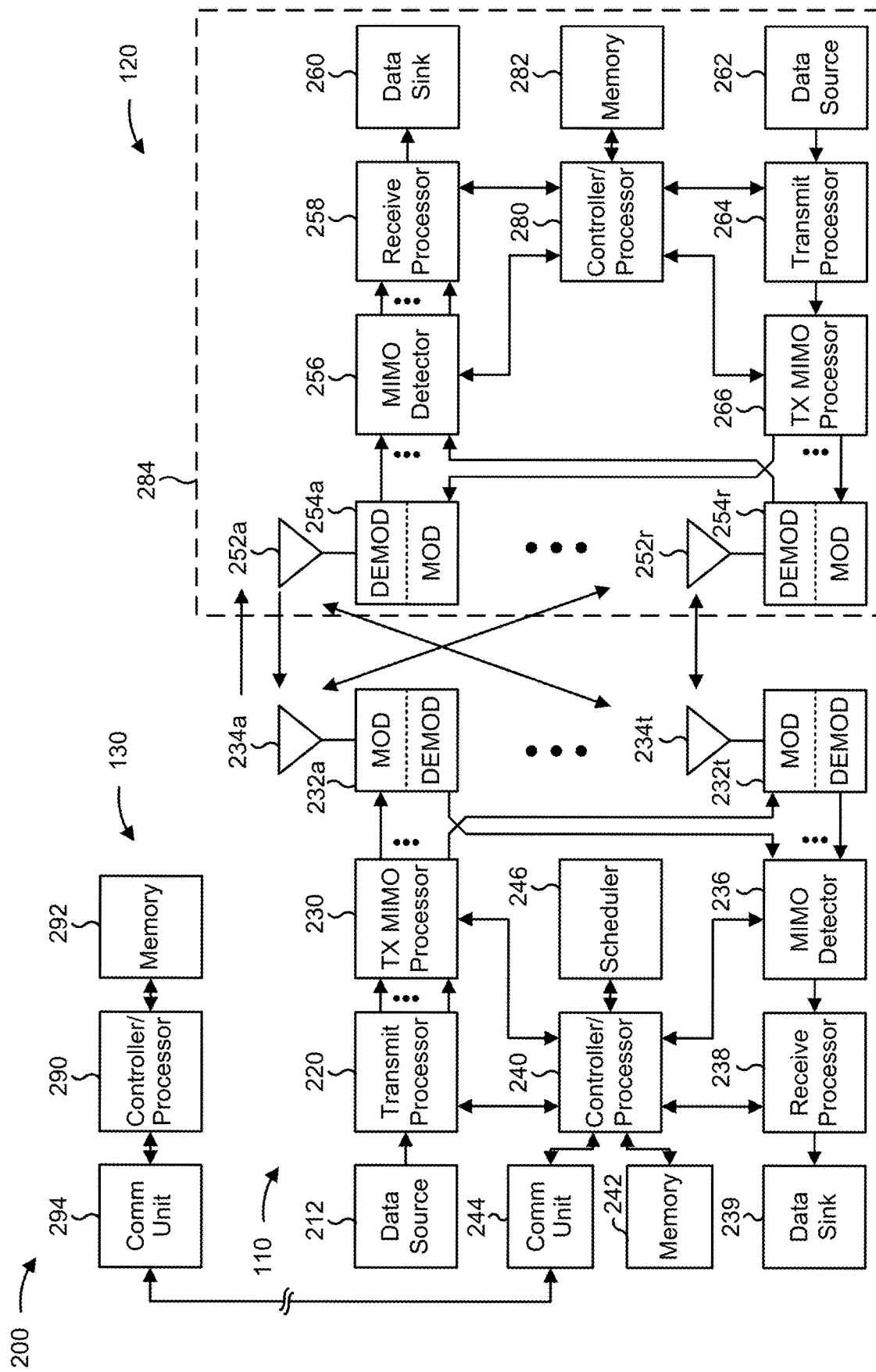
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with a layer 2 UE relay procedure, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for identifying a relay UE that is operating in a connected discontinuous reception mode, wherein the relay UE and UE 120 are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station, means for transmitting one or more layer-2 communications to or receiving one or more layer-2 communications from the base station via the relay UE, and/or the like. In some aspects, UE 120 may include means for identifying, while in a connected discontinuous reception mode, a remote UE, wherein UE 120 and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station, means for relaying one or more layer-2 communications between the base station and the remote UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for identifying a remote UE and a relay UE that is operating in a connected discontinuous reception mode, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station, means for configuring one or more links between two or more of the remote UE, the relay UE, or BS 110 based at least in part on identifying the remote UE and the relay UE, means for transmitting one or more layer-2 communications to or receiving one or more layer-2 communications from the remote UE via the relay UE based at least in part on configuring the one or more links, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
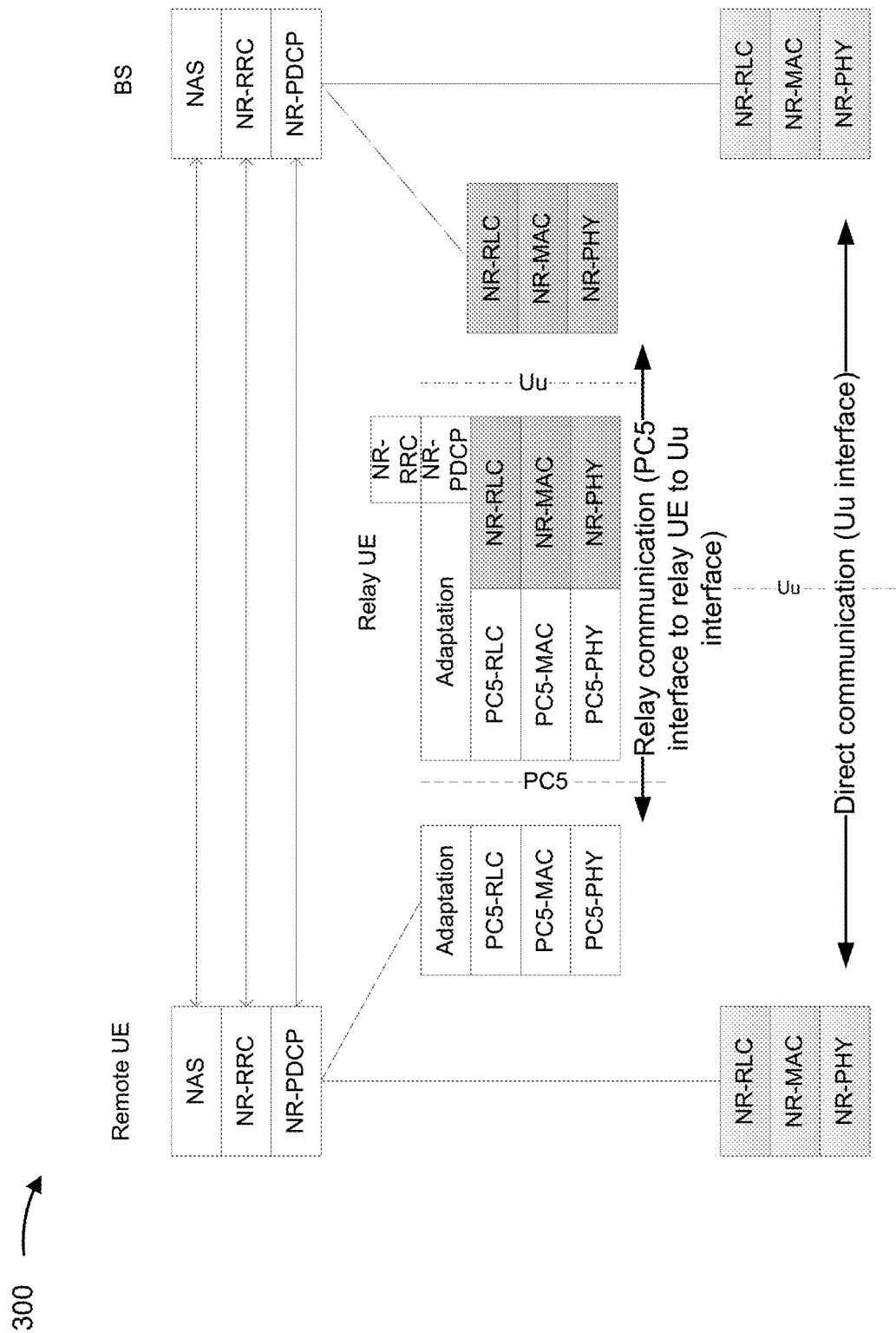
FIG. 3 is a diagram illustrating an example of a protocol stack for layer 2 UE relay, in accordance with the present disclosure.

FIG. 3 is a diagram illustrating an example 300 of a protocol stack for layer 2 UE relaying, in accordance with the present disclosure.

As shown in FIG. 3, an NR protocol stack includes a non-access stratum (NAS) layer, a radio resource control (RRC) layer, and/or a packet data convergence protocol (PDCP) layer, among other examples. The PDCP layer may be layer 2 in the NR protocol stack and may include a plurality of sub-layers. For example, the PDCP layer may include an adaptation sub-layer (e.g., a service data adaptation protocol (SDAP) sub-layer), a radio link control (RLC) sub-layer, a medium access control (MAC) sub-layer, and/or a physical (PHY) sub-layer, among other examples.

When communicating directly with a BS (e.g., via a Uu interface), a remote UE may communicate at an NR-RLC sub-layer, an NR-MAC sub-layer, and an NR-PHY layer. However, in a relay scenario, the remote UE may communicate via a PC5 interface with a relay UE. For example, the remote UE may include a PC5-RLC sub-layer, a PC5-MAC sub-layer, and a PC5-PHY sub-layer to communicate with a corresponding PC5-RLC sub-layer, PC5-MAC sub-layer, and PC5-PHY sub-layer of the relay UE. The relay UE may also include an NR-RLC sub-layer, an NR-MAC sub-layer, and an NR-PHY sub-layer to communicate via a Uu interface with corresponding sub-layers of the BS. Based at least in part on passing information between PC5 sub-layers and NR sub-layers, the relay UE enables layer 2 relaying between the remote UE and the BS.

As indicated above, FIG. 3 is provided as an example. Other examples may differ from what is described with respect to FIG. 3.

Figure 4:
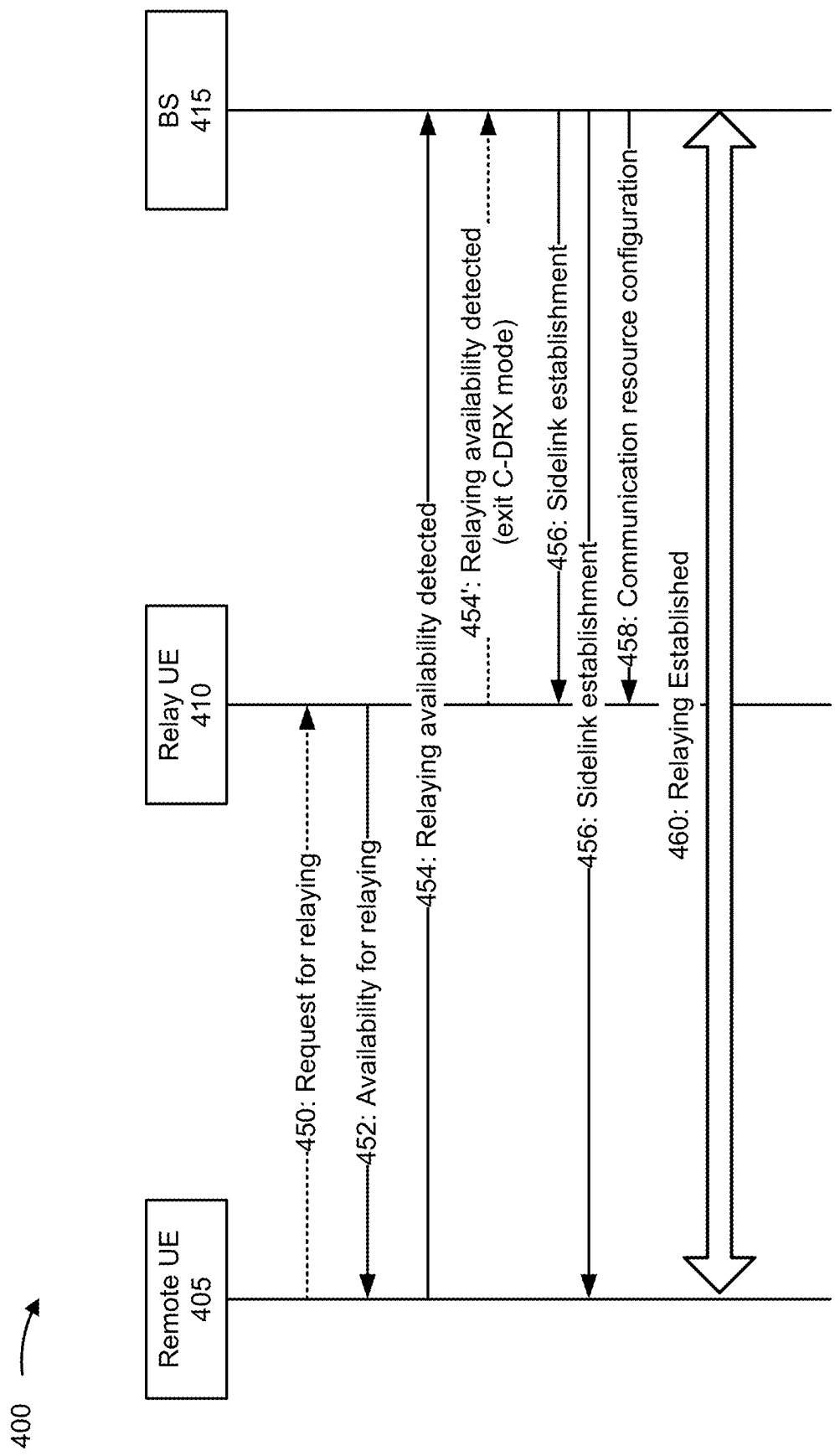
FIG. 4 is a diagram illustrating an example of layer 2 UE relay, in accordance with the present disclosure.

FIG. 4 is a diagram illustrating an example 400 of layer 2 UE relaying, in accordance with the present disclosure. As shown in FIG. 4, example 400 may include a remote UE 405 (e.g., which may correspond to UE 120e), a relay UE 410 (e.g., which may correspond to UE 120a), and a BS 415 (e.g., which may correspond to BS 110).

As further shown in FIG. 4, and by reference number 450, in some aspects, remote UE 405 may transmit a request for relaying. For example, remote UE 405 may transmit a set of unicast messages, broadcast messages, and/or multicast messages, among other examples, requesting availability of another UE for relaying of communications with BS 415. As shown in by reference number 452, relay UE 410 may provide information indicating an availability of relaying. For example, relay UE 410 may receive a request for relaying from remote UE 405 and may transmit a response message indicating an availability for relaying. In this case, relay UE 410 may determine an availability for relaying based at least in part on a UE capability, a level of communication activity on relay UE 410, and/or a use of relay UE 410 for relaying for another UE, among other examples. Additionally, or alternatively, relay UE 410 may periodically transmit signaling indicating an availability for relaying (e.g., via broadcast signaling) and remote UE 405 may detect the signaling indicating the availability for relaying. In some aspects, relay UE 410 may be in a connected discontinuous reception (C-DRX) mode on a Uu interface with BS 415.

As further shown in FIG. 4, and by reference number 454/454', remote UE 405 and/or relay UE 410 may transmit a notification to BS 415 indicating an availability of relaying. For example, remote UE 405 may indicate an identification of relay UE 410. In some aspects, remote UE 405 may provide a measurement report regarding a sidelink connection between remote UE 405 and relay 410. For example, remote UE 405 may provide a measurement report that includes an identifier of relay UE 410. In this case, remote UE 405 may include an explicit identifier of relay UE 410, and/or an implicit identifier of relay UE 410, among other examples, in the measurement report. In some aspects, relay UE 410 may remain in the C-DRX mode on the Uu interface with BS 415. For example, when remote UE 405 provides the measurement report, relay UE 410 may remain in the C-DRX mode on the Uu interface with BS 415.

Additionally, or alternatively, based at least in part on remote UE 405 identifying relay UE 410 for relaying, relay UE 410 may transition from the C-DRX mode to another mode and may provide information to BS 415. For example, relay UE 410 may transmit a scheduling request in a DRX off mode to BS 415. In this case, relay UE 410 may indicate, to BS 415, an identification of remote UE 405 and/or provide a measurement report of the sidelink between remote UE 405 and relay UE 410 to trigger relaying. In some aspects, relay UE 410 may delay transmitting information regarding relaying to BS 415 until a DRX on period occurs. For example, when relay UE 410 enters a DRX on period, relay UE 410 may use the DRX on period to transmit information regarding remote UE 405, and/or a measurement report, among other examples.

As further shown in FIG. 4, and by reference numbers 456, BS 415 may transmit sidelink establishment messages to relay UE 410 and/or remote UE 405. For example, BS 415 may, based at least in part on the measurement report, determine to activate relay UE 410 for relaying. In this case, BS 415 may transmit information to establish a sidelink relaying connection between remote UE 405 and relay UE 410. In some aspects, BS 415 may transmit a reconfiguration message to relay UE 410 and/or remote UE 405 to establish the sidelink connection. As shown reference numbers 458 and 460, based at least in part on establishing the sidelink connection, BS 415 may allocate resources for relaying and communicate using relay UE 410 as a relay. For example, BS 415 may transmit information identifying a grant to relay UE 410. Additionally, or alternatively, BS 415 may configure a grant on a Uu interface between relay UE 410 and BS 415. In this case, using the identified grant or configured grant, BS 415 and remote UE 405 may communicate via relay UE 410. For example, relay 410 may provide layer 2 relaying of PDCP data, as described above.

As indicated above, FIG. 4 is provided as an example. Other examples may differ from what is described with respect to FIG. 4.

Figure 5:
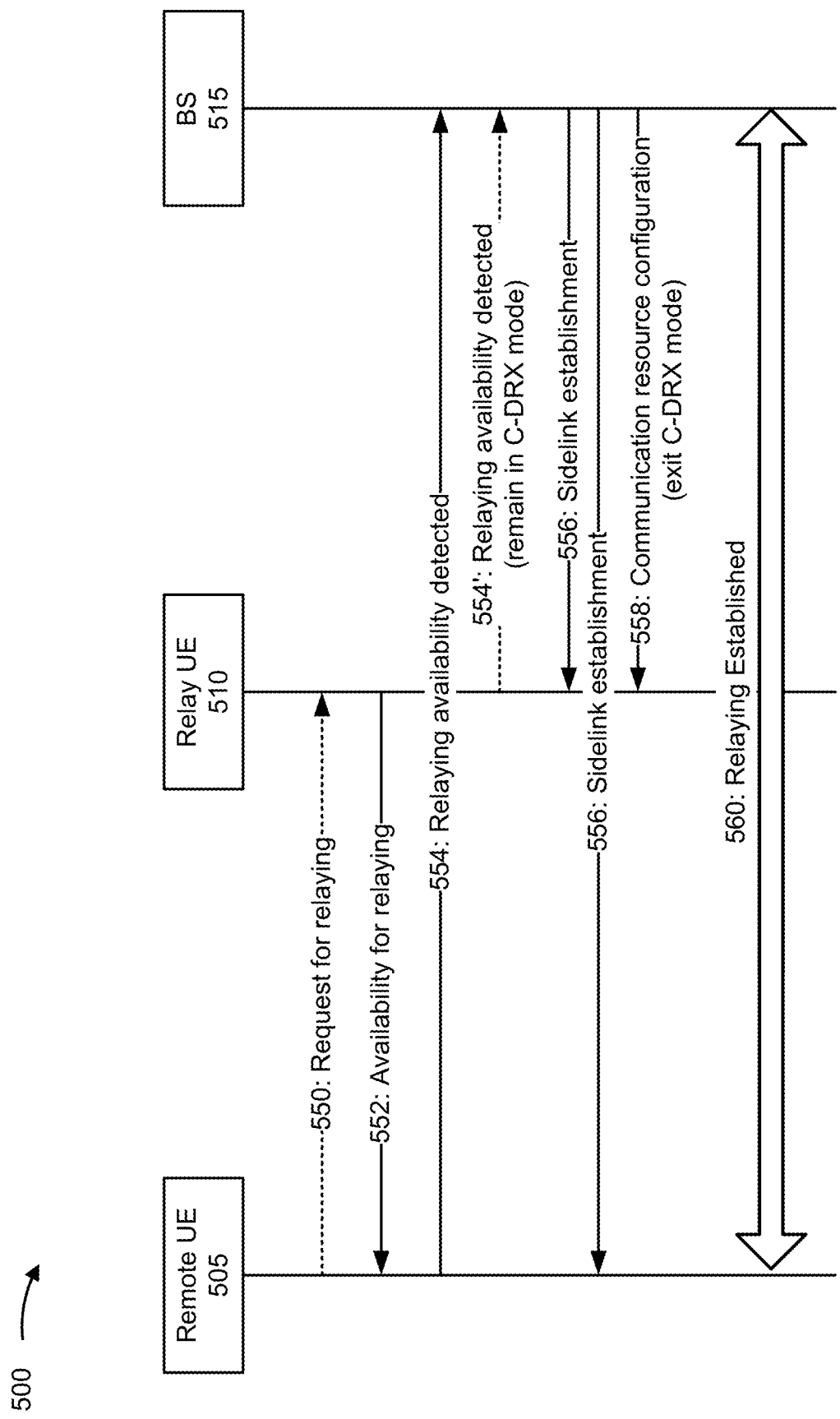
FIG. 5 is a diagram illustrating an example of layer 2 UE relay, in accordance with the present disclosure.

FIG. 5 is a diagram illustrating an example 500 of layer 2 UE relaying, in accordance with the present disclosure. As shown in FIG. 5, example 500 may include a remote UE 505 (e.g., which may correspond to UE 120e), a relay UE 510 (e.g., which may correspond to UE 120a), and a BS 515 (e.g., which may correspond to BS 110).

As further shown in FIG. 5, and by reference number 550, in some aspects, remote UE 505 may transmit a request for relaying. For example, remote UE 505 may transmit a set of unicast messages, broadcast messages, and/or multicast messages, among other examples, requesting availability of another UE for relaying of communications with BS 515. As shown in by reference number 552, relay UE 510 may provide information indicating an availability of relaying. For example, when relay UE 510 is in a DRX mode on a sidelink, relay UE 510 may receive a request for relaying from remote UE 505 and may transmit a response message indicating an availability for relaying during a sidelink DRX on time. Additionally, or alternatively, relay UE 510 may periodically transmit signaling indicating an availability for relaying (e.g., via broadcast signaling during the sidelink DRX on time) and remote UE 505 may detect the signaling indicating the availability for relaying.

As further shown in FIG. 5, and by reference number 554/554', remote UE 505 or relay UE 510 may transmit a notification to BS 515 indicating an availability of relaying. For example, remote UE 505 may indicate an identification of relay UE 510, and/or a measurement report regarding a sidelink connection between remote UE 505 and relay 510, among other examples.

Additionally, or alternatively, based at least in part on remote UE 505 identifying relay UE 510 for relaying, relay UE 510 may remain in a C-DRX mode on a sidelink, and may communicate with BS 515 to indicate identification of remote UE 505 and/or to provide a measurement report. In some aspects, when relay UE 510 is in a C-DRX mode on a Uu link, relay UE 510 may come out of the C-DRX mode on the Uu link and transmit a scheduling request, and/or a measurement report, among other examples.

As further shown in FIG. 5, and by reference numbers 556, BS 515 may transmit a sidelink establishment message to relay UE 510 and/or remote UE 505. For example, BS 515 may activate relay UE 510 during an on time of relay UE 510 and may provide grants relay UE 510 to perform relaying. In this case, BS 515 may configure resources for relay UE 510 to perform relaying, which may cause relay UE 510 to transition out of a C-DRX mode on a Uu link, and/or a sidelink, among other examples, as shown by reference number 558, and perform relaying, as shown in by reference number 560.

As indicated above, FIG. 5 is provided as an example. Other examples may differ from what is described with respect to FIG. 5.

Figure 6:
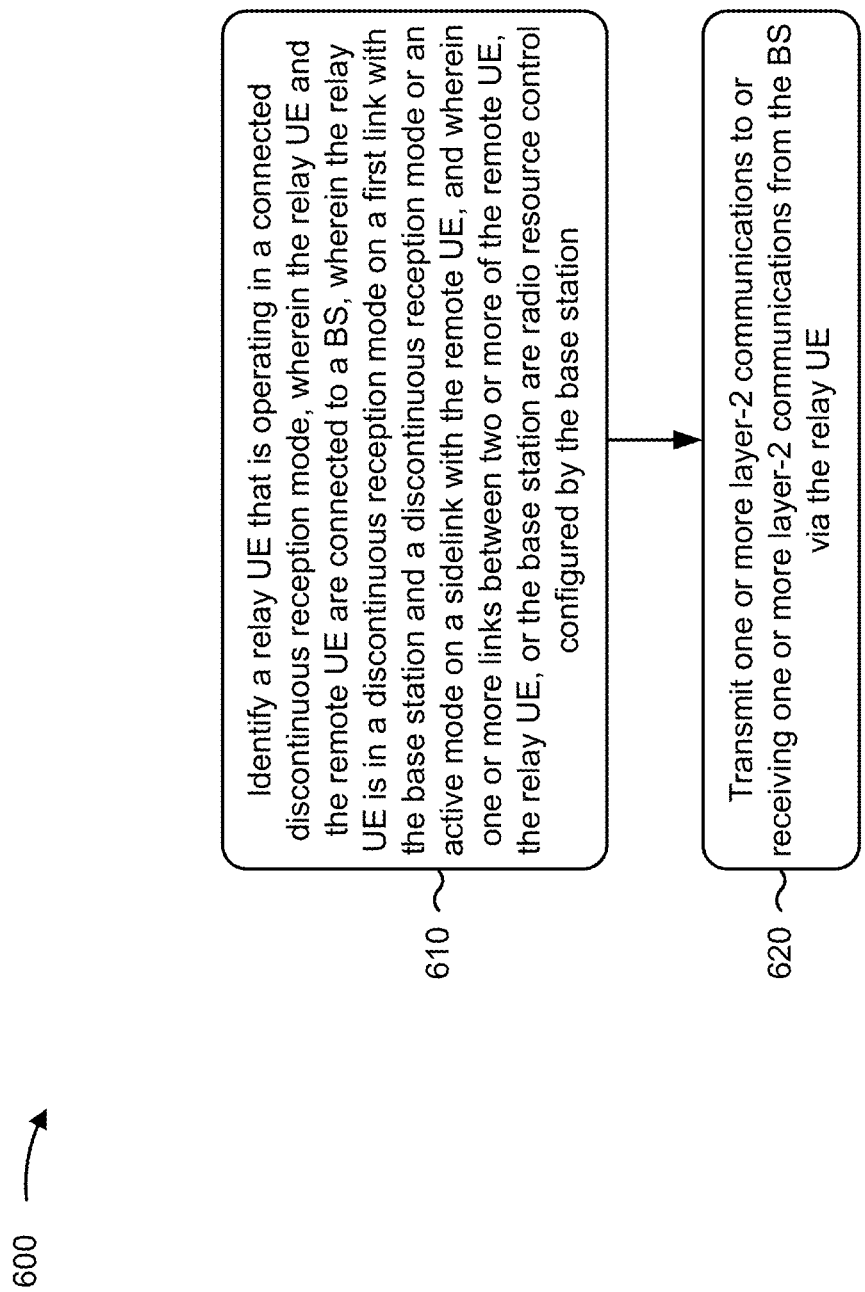
FIG. 6 is a diagram illustrating an example process performed, for example, by a remote UE, in accordance with the present disclosure.

FIG. 6 is a diagram illustrating an example process 600 performed, for example, by a remote UE, in accordance with the present disclosure. Example process 600 is an example where the remote UE (e.g., UE 120, remote UE 405, and/or remote UE 505) performs operations associated with layer 2 UE relaying.

As shown in FIG. 6, in some aspects, process 600 may include identifying a relay UE that is operating in a connected discontinuous reception mode, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station (block 610). For example, the remote UE (e.g., using controller/processor 280) may identify a relay UE that is operating in a connected discontinuous reception mode, as described above. In some aspects, the relay UE and the remote UE are connected to a base station. In some aspects, the relay UE is in a discontinuous reception mode on a first link with the base station and a discontinuous reception mode or an active mode on a sidelink with the remote UE. In some aspects, one or more links between two or more of the remote UE, the relay UE, or the base station are radio resource control configured by the base station As further shown in FIG. 6, in some aspects, process 600 may include transmitting one or more layer-2 communications to or receiving one or more layer-2 communications from the base station via the relay UE (block 620). For example, the remote UE (e.g., using controller/processor 280, transmit processor 264, TX MIMO processor 266, MOD 254, and/or antenna 252) may transmit one or more layer-2 communications to or receiving one or more layer-2 communications from the base station via the relay UE, as described above.

Process 600 may include additional aspects, such as any single aspect or any combination of aspects described below and/or in connection with one or more other processes described elsewhere herein.

In a first aspect, transmitting the one or more layer-2 communications to or receiving the one or more layer-2 communications from the base station via the relay UE includes communicating with the base station via a packet data convergence protocol split bearer.

In a second aspect, alone or in combination with the first aspect, one or more links between two or more of the remote UE, the relay UE, or the base station are radio resource control configured.

In a third aspect, alone or in combination with one or more of the first and second aspects, data is scheduled on one or more links between two or more of the remote UE, the relay UE, or the base station based at least in part on at least one of a link quality, a resource availability, a time division duplexing configuration, a transmit beam configuration, a receive beam configuration, or a carrier frequency.

In a fourth aspect, alone or in combination with one or more of the first through third aspects, process 600 includes performing a radio link monitoring procedure on one or more links between the remote UE and the relay UE or the remote UE and the base station; and initiating a radio link failure recovery procedure based at least in part on a result of performing the radio link monitoring procedure.

In a fifth aspect, alone or in combination with one or more of the first through fourth aspects, identifying the relay UE includes transmitting one or more requests for relaying, and detecting signaling identifying an availability of the relay UE for relaying.

In a sixth aspect, alone or in combination with one or more of the first through fifth aspects, identifying the relay UE includes transmitting information indicating a detection of the relay UE for relaying.

In a seventh aspect, alone or in combination with one or more of the first through sixth aspects, the information includes at least one of a measurement report of a link between the remote UE and the relay UE, or a UE identifier.

In an eighth aspect, alone or in combination with one or more of the first through seventh aspects, process 600 includes receiving, from the base station, a reconfiguration message to establish a dedicated sidelink with the relay UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
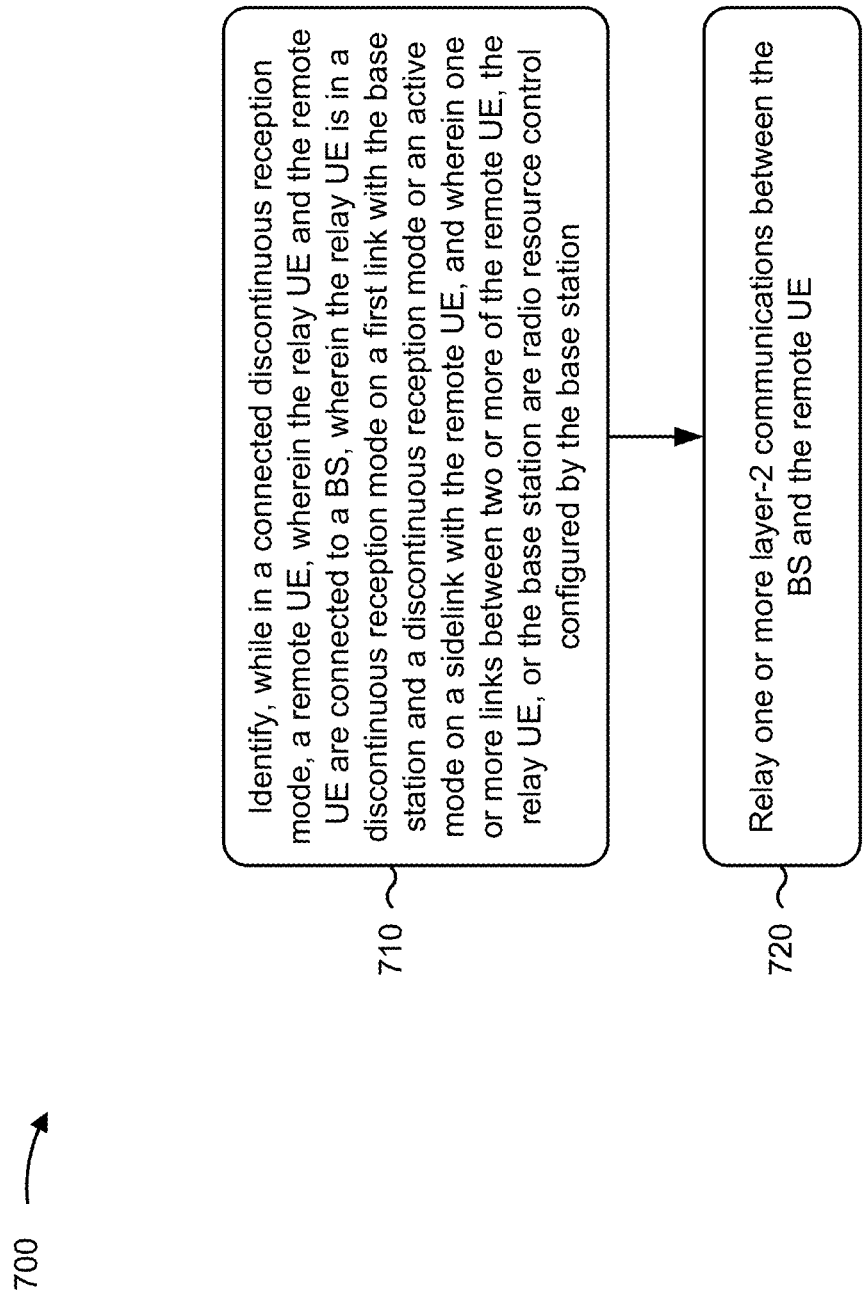
FIG. 7 is a diagram illustrating an example process performed, for example, by a relay UE, in accordance with the present disclosure.

FIG. 7 is a diagram illustrating an example process 700 performed, for example, by a relay UE, in accordance with the present disclosure. Example process 700 is an example where the relay UE (e.g., UE 120, relay UE 410, and/or relay UE 510) performs operations associated with layer 2 UE relaying.

As shown in FIG. 7, in some aspects, process 700 may include identifying, while in a connected discontinuous reception mode, a remote UE, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station (block 710). For example, the relay UE (e.g., using controller/processor 280) may identify, while in a connected discontinuous reception mode, a remote UE, as described above. In some aspects, the relay UE and the remote UE are connected to a base station. In some aspects, the relay UE is in a discontinuous reception mode on a first link with the base station and a discontinuous reception mode or an active mode on a sidelink with the remote UE. In some aspects, one or more links between two or more of the remote UE, the relay UE, or the base station are radio resource control configured by the base station As further shown in FIG. 7, in some aspects, process 700 may include relaying one or more layer-2 communications between the base station and the remote UE (block 720). For example, the relay UE (e.g., using controller/processor 280, transmit processor 264, TX MIMO processor 266, MOD 254, and/or antenna 252) may relay one or more layer-2 communications between the base station and the remote UE, as described above.

Process 700 may include additional aspects, such as any single aspect or any combination of aspects described below and/or in connection with one or more other processes described elsewhere herein.

In a first aspect, relaying the one or more layer-2 communications between the base station and the remote UE includes relaying the one or more layer-2 communications via a packet data convergence protocol split bearer.

In a second aspect, alone or in combination with the first aspect, one or more links between two or more of the remote UE, the relay UE, or the base station are radio resource control configured.

In a third aspect, alone or in combination with one or more of the first and second aspects, data is scheduled on one or more links between two or more of the remote UE, the relay UE, or the base station based at least in part on at least one of a link quality, a resource availability, a time division duplexing configuration, a transmit beam configuration, a receive beam configuration, or a carrier frequency.

In a fourth aspect, alone or in combination with one or more of the first through third aspects, process 700 includes performing a radio link monitoring procedure on one or more links between the remote UE and the relay UE or the relay UE and the base station; and initiating a radio link failure recovery procedure based at least in part on a result of performing the radio link monitoring procedure.

In a fifth aspect, alone or in combination with one or more of the first through fourth aspects, identifying the remote UE includes receiving, from the remote UE, one or more requests for relaying, and transmitting signaling identifying an availability of the relay UE for relaying.

In a sixth aspect, alone or in combination with one or more of the first through fifth aspects, the one or more requests are received during a sidelink discontinuous reception on time and the signaling identifying the availability of the relay UE is broadcasted during the sidelink discontinuous reception on time.

In a seventh aspect, alone or in combination with one or more of the first through sixth aspects, process 700 includes remaining in the connected discontinuous reception mode on a link with the base station based at least in part on identifying the remote UE.

In an eighth aspect, alone or in combination with one or more of the first through seventh aspects, process 700 includes transitioning from the connected discontinuous reception mode to another mode on a link with the base station based at least in part on identifying the remote UE.

In a ninth aspect, alone or in combination with one or more of the first through eighth aspects, identifying the remote UE includes switching from the connected discontinuous reception mode to another mode, and transmitting information indicating identification of the remote UE to the base station.

In a tenth aspect, alone or in combination with one or more of the first through ninth aspects, process 700 includes receiving, from the base station, a reconfiguration message to establish a dedicated sidelink with the remote UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
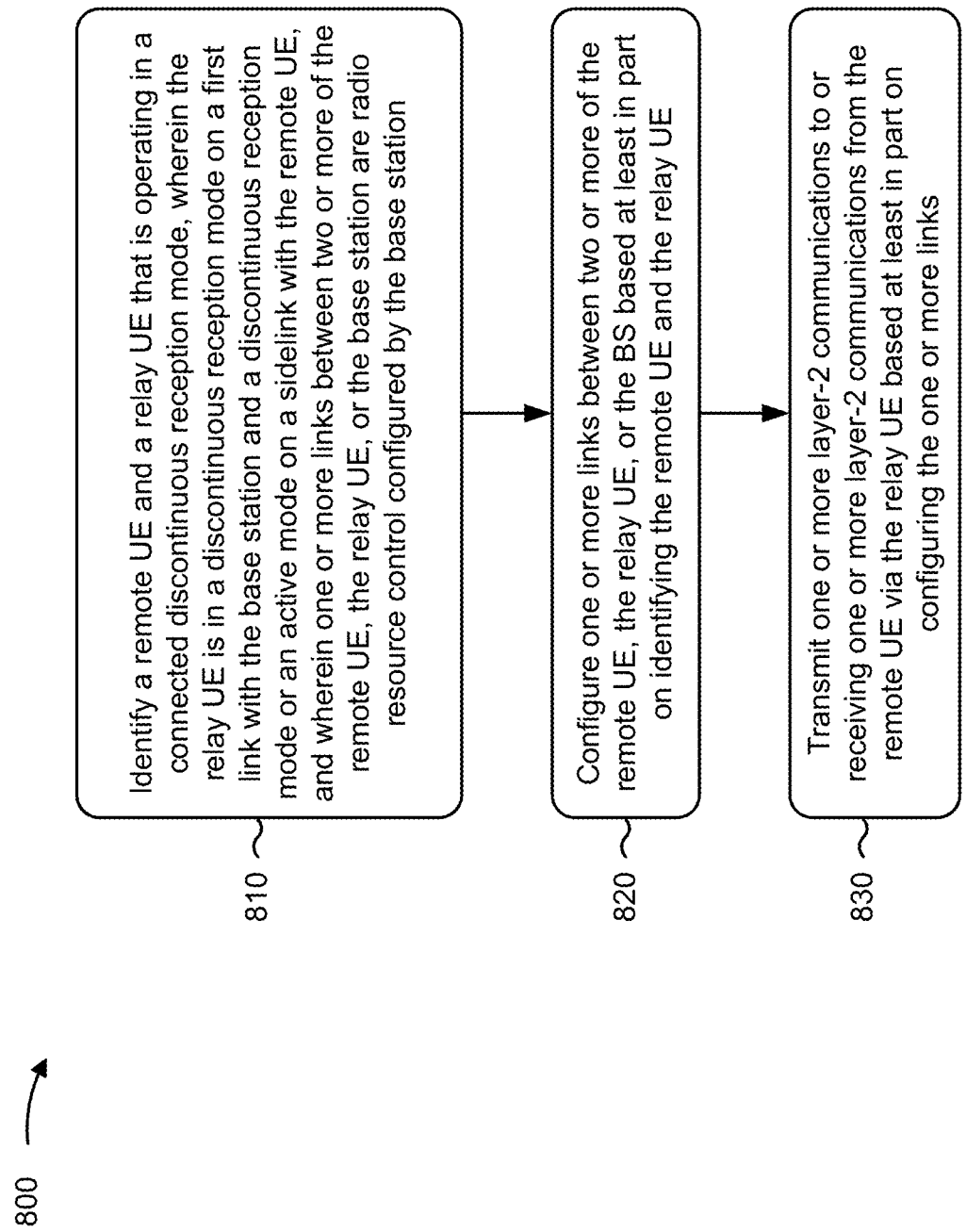
FIG. 8 is a diagram illustrating an example process performed, for example, by a BS, in accordance with the present disclosure.

FIG. 8 is a diagram illustrating an example process 800 performed, for example, by a BS, in accordance with the present disclosure. Example process 800 is an example where the BS (e.g., BS 110, BS 415, and/or BS 515) performs operations associated with layer 2 UE relaying.

As shown in FIG. 8, in some aspects, process 800 may include identifying a remote UE and a relay UE that is operating in a connected discontinuous reception mode, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station (block 810). For example, the BS (e.g., using controller/processor 240) may identify a remote UE and a relay UE that is operating in a connected discontinuous reception mode, a remote UE, as described above. In some aspects, the relay UE is in a discontinuous reception mode on a first link with the base station and a discontinuous reception mode or an active mode on a sidelink with the remote UE. In some aspects, one or more links between two or more of the remote UE, the relay UE, or the base station are radio resource control configured by the base station As further shown in FIG. 8, in some aspects, process 800 may include configuring one or more links between two or more of the remote UE, the relay UE, or the BS based at least in part on identifying the remote UE and the relay UE (block 820). For example, the BS (e.g., using controller/processor 240, transmit processor 220, TX MIMO processor 230, MOD 232, and/or antenna 234) may configure one or more links between two or more of the remote UE, the relay UE, or the BS based at least in part on identifying the remote UE and the relay UE, as described above.

As further shown in FIG. 8, in some aspects, process 800 may include transmitting one or more layer-2 communications to or receiving one or more layer-2 communications from the remote UE via the relay UE based at least in part on configuring the one or more links (block 830). For example, the BS (e.g., using controller/processor 240, transmit processor 220, TX MIMO processor 230, MOD 232, and/or antenna 234) may transmit one or more layer-2 communications to or receiving one or more layer-2 communications from the remote UE via the relay UE based at least in part on configuring the one or more links, as described above.

Process 800 may include additional aspects, such as any single aspect or any combination of aspects described below and/or in connection with one or more other processes described elsewhere herein.

In a first aspect, transmitting the one or more layer-2 communications to or receiving the one or more layer-2 communications from the remote UE via the relay UE includes communicating with the remote UE via a packet data convergence protocol split bearer.

In a second aspect, alone or in combination with the first aspect, configuring the one or more links includes configuring the one or more links using radio resource control.

In a third aspect, alone or in combination with one or more of the first and second aspects, configuring the one or more links includes scheduling data on the one or more links based at least in part on at least one of: a link quality, a resource availability, a time division duplexing configuration, a transmit beam configuration, a receive beam configuration, or a carrier frequency.

In a fourth aspect, alone or in combination with one or more of the first through third aspects, process 800 includes performing a radio link monitoring procedure on at least one of a first link between the remote UE and the BS or a second link between the relay UE and the BS; and initiating a radio link failure recovery procedure based at least in part on a result of performing the radio link monitoring procedure.

In a fifth aspect, alone or in combination with one or more of the first through fourth aspects, identifying the remote UE and the relay UE includes receiving information from the remote UE or the relay UE identifying the remote UE or the relay UE.

In a sixth aspect, alone or in combination with one or more of the first through fifth aspects, configuring the one or more links includes transmitting a set of reconfiguration messages to at least one of the relay UE or the remote UE to establish a sidelink connection between the relay UE and the remote UE.

In a seventh aspect, alone or in combination with one or more of the first through sixth aspects, configuring the one or more links includes transmitting a grant to the relay UE.

In an eighth aspect, alone or in combination with one or more of the first through seventh aspects, configuring the one or more links includes configuring a grant on the one or more links.

In a ninth aspect, alone or in combination with one or more of the first through eighth aspects, configuring the one or more links includes configuring the relay UE during an on time of the relay UE.

In a tenth aspect, alone or in combination with one or more of the first through ninth aspects, the information includes at least one of a discovery indication or a measurement report of a sidelink between the remote UE and the relay UE.

In an eleventh aspect, alone or in combination with one or more of the first through tenth aspects, process 800 includes determining to activate relaying based at least in part on the information from the remote UE or the relay UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a remote user equipment (UE), comprising: identifying a relay UE that is operating in a connected discontinuous reception mode, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and transmitting one or more layer-2 communications to, or receiving one or more layer-2 communications from, the base station via the relay UE.

Aspect 2: The method of Aspect 1, wherein transmitting the one or more layer-2 communications to, or receiving the one or more layer-2 communications from, the base station via the relay UE comprises: communicating with the base station via a packet data convergence protocol split bearer.

Aspect 3: The method of any of Aspects 1-2, wherein data is scheduled on one or more links between two or more of the remote UE, the relay UE, or the base station based at least in part on at least one of: a link quality, a resource availability, a time division duplexing configuration, a transmit beam configuration, a receive beam configuration, or a carrier frequency.

Aspect 4: The method of any of Aspects 1-3, further comprising: performing a radio link monitoring procedure on one or more links between the remote UE and the relay UE or the remote UE and the base station; and initiating a radio link failure recovery procedure based at least in part on a result of performing the radio link monitoring procedure.

Aspect 5: The method of any of Aspects 1-4, wherein identifying the relay UE comprises: transmitting one or more requests for relaying; and detecting signaling identifying an availability of the relay UE for relaying.

Aspect 6: The method of Aspect 5, wherein identifying the relay UE comprises: transmitting information indicating a detection of the relay UE for relaying.

Aspect 7: The method of Aspect 6, wherein the information includes at least one of: a measurement report of a link between the remote UE and the relay UE, or a UE identifier.

Aspect 8: The method of any of Aspects 1-7, further comprising: receiving, from the base station, a reconfiguration message to establish a dedicated sidelink with the relay UE.

Aspect 9: A method of wireless communication performed by a relay user equipment (UE), comprising: identifying, while in a connected discontinuous reception mode, a remote UE, wherein the relay UE and the remote UE are connected to a base station, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; and relaying one or more layer-2 communications between the base station and the remote UE.

Aspect 10: The method of Aspect 9, wherein relaying the one or more layer-2 communications between the base station and the remote UE comprises: relaying the one or more layer-2 communications via a packet data convergence protocol split bearer.

Aspect 11: The method of any of Aspects 9-10, wherein data is scheduled on one or more links between two or more of the remote UE, the relay UE, or the base station based at least in part on at least one of: a link quality, a resource availability, a time division duplexing configuration, a transmit beam configuration, a receive beam configuration, or a carrier frequency.

Aspect 12: The method of any of Aspects 9-11, further comprising: performing a radio link monitoring procedure on one or more links between the remote UE and the relay UE or the relay UE and the base station; and initiating a radio link failure recovery procedure based at least in part on a result of performing the radio link monitoring procedure.

Aspect 13: The method of any of Aspects 9-12, wherein identifying the remote UE comprises: receiving, from the remote UE, one or more requests for relaying; and transmitting signaling identifying an availability of the relay UE for relaying.

Aspect 14: The method of Aspect 13, wherein the one or more requests are received during a sidelink discontinuous reception on time and the signaling identifying the availability of the relay UE is broadcasted during the sidelink discontinuous reception on time.

Aspect 15: The method of any of Aspects 9-14, further comprising: remaining in the connected discontinuous reception mode on a link with the base station based at least in part on identifying the remote UE.

Aspect 16: The method of any of Aspects 9-14, further comprising: transitioning from the connected discontinuous reception mode to another mode on a link with the base station based at least in part on identifying the remote UE.

Aspect 17: The method of any of Aspects 9-16, wherein identifying the remote UE comprises: switching from the connected discontinuous reception mode to another mode; and transmitting information indicating identification of the remote UE to the base station.

Aspect 18: The method of any of Aspects 9-17, further comprising: receiving, from the base station, a reconfiguration message to establish a dedicated sidelink with the remote UE.

Aspect 19: A method of wireless communication performed by a base station, comprising: identifying a remote user equipment (UE) and a relay UE that is operating in a connected discontinuous reception mode, wherein the relay UE is in a discontinuous reception mode on a first link with the base station and a discontinuous reception mode or an active mode on a sidelink with the remote UE, and wherein one or more links between two or more of the remote UE, the relay UE, or the base station are radio resource control configured by the base station; configuring one or more links between two or more of the remote UE, the relay UE, or the base station based at least in part on identifying the remote UE and the relay UE; and transmitting one or more layer-2 communications to, or receiving one or more layer-2 communications from, the remote UE via the relay UE based at least in part on configuring the one or more links.

Aspect 20: The method of Aspect 19, wherein transmitting the one or more layer-2 communications to, or receiving the one or more layer-2 communications from, the remote UE via the relay UE comprises: communicating with the remote UE via a packet data convergence protocol split bearer.

Aspect 21: The method of any of Aspects 19-20, wherein configuring the one or more links comprises: configuring the one or more links using radio resource control.

Aspect 22: The method of any of Aspects 19-21, wherein configuring the one or more links comprises: scheduling data on the one or more links based at least in part on at least one of: a link quality, a resource availability, a time division duplexing configuration, a transmit beam configuration, a receive beam configuration, or a carrier frequency.

Aspect 23: The method of any of Aspects 19-22, further comprising: performing a radio link monitoring procedure on at least one of a first link between the remote UE and the base station or a second link between the relay UE and the base station; and initiating a radio link failure recovery procedure based at least in part on a result of performing the radio link monitoring procedure.

Aspect 24: The method of any of Aspects 19-23, wherein identifying the remote UE and the relay UE comprises: receiving information from the remote UE or the relay UE identifying the remote UE or the relay UE.

Aspect 25: The method of Aspect 24, wherein the information includes at least one of a discovery indication or a measurement report of a sidelink between the remote UE and the relay UE.

Aspect 26: The method of any of Aspects 24-25, further comprising: determining to activate relaying based at least in part on the information from the remote UE or the relay UE.

Aspect 27: The method of any of Aspects 19-26, wherein configuring the one or more links comprises: transmitting a set of reconfiguration messages to at least one of the relay UE or the remote UE to establish a sidelink connection between the relay UE and the remote UE.

Aspect 28: The method of any of Aspects 19-27, wherein configuring the one or more links comprises: transmitting a grant to the relay UE.

Aspect 29: The method of any of Aspects 19-28, wherein configuring the one or more links comprises: configuring a grant on the one or more links.

Aspect 30: The method of any of Aspects 19-29, wherein configuring the one or more links comprises: configuring the relay UE during an on time of the relay UE.

Aspect 31: An apparatus for wireless communication at a device, comprising a processor; memory coupled with the processor; and instructions stored in the memory and executable by the processor to cause the apparatus to perform the method of one or more Aspects of Aspects 1-8 and/or Aspects 9-18.

Aspect 32: A device for wireless communication, comprising a memory and one or more processors coupled to the memory, the memory and the one or more processors configured to perform the method of one or more Aspects of Aspects 1-8 and/or Aspects 9-18.

Aspect 33: An apparatus for wireless communication, comprising at least one means for performing the method of one or more Aspects of Aspects 1-8 and/or Aspects 9-18.

Aspect 34: A non-transitory computer-readable medium storing code for wireless communication, the code comprising instructions executable by a processor to perform the method of one or more Aspects of Aspects 1-8 and/or Aspects 9-18.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-8 and/or Aspects 9-18.

Aspect 36: An apparatus for wireless communication at a device, comprising a processor; memory coupled with the processor; and instructions stored in the memory and executable by the processor to cause the apparatus to perform the method of one or more Aspects of Aspects 19-30.

Aspect 37: A device for wireless communication, comprising a memory and one or more processors coupled to the memory, the memory and the one or more processors configured to perform the method of one or more Aspects of Aspects 19-30.

Aspect 38: An apparatus for wireless communication, comprising at least one means for performing the method of one or more Aspects of Aspects 19-30.

Aspect 39: A non-transitory computer-readable medium storing code for wireless communication, the code comprising instructions executable by a processor to perform the method of one or more Aspects of Aspects 19-30.

Aspect 40: A non-transitory computer-readable medium storing a set of instructions for wireless communication, the set of instructions comprising one or more instructions that, when executed by one or more processors of a device, cause the device to perform the method of one or more Aspects of Aspects 19-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a remote user equipment (UE), comprising:
    identifying a relay UE that is operating in a connected discontinuous reception mode,
        wherein the relay UE and the remote UE are connected to a base station,
        wherein the relay UE is in the connected discontinuous reception mode on a link with the base station, and
        wherein one or more links between two or more of the remote UE, the relay UE, or the base station are radio resource control configured by the base station; and
    transmitting one or more layer-2 communications to, or receiving the one or more layer-2 communications from, the base station via the relay UE based at least in part on the relay UE being transitioned to another mode, different from the connected discontinuous reception mode, on the link with the base station.

2. The method of claim 1, wherein transmitting the one or more layer-2 communications to, or receiving the one or more layer-2 communications from, the base station via the relay UE comprises:
    communicating with the base station via a packet data convergence protocol split bearer.

3. The method of claim 1, further comprising:
    performing a radio link monitoring procedure on one or more links between the remote UE and the relay UE or the remote UE and the base station; and
    initiating a radio link failure recovery procedure based at least in part on a result of performing the radio link monitoring procedure.

4. The method of claim 1, wherein identifying the relay UE comprises:
    transmitting one or more requests for relaying; and
    detecting signaling identifying an availability of the relay UE for relaying.

5. The method of claim 4, wherein identifying the relay UE comprises:
    transmitting information indicating a detection of the relay UE for relaying.

6. The method of claim 5, wherein the information includes at least one of:
    a measurement report of a link between the remote UE and the relay UE, or
    a UE identifier.

7. The method of claim 1, further comprising:
    receiving, from the base station, a reconfiguration message to establish a dedicated sidelink with the relay UE.

8. A method of wireless communication performed by a relay user equipment (UE), comprising:
    identifying, while in a connected discontinuous reception mode, a remote UE,
        wherein the relay UE and the remote UE are connected to a base station,
        wherein the relay UE is in the connected discontinuous reception mode on a link with the base station, and
        wherein one or more links between two or more of the remote UE, the relay UE, or the base station are radio resource control configured by the base station;
    transitioning from the connected discontinuous reception mode to another mode, different from the connected discontinuous reception mode, on the link with the base station; and
    relaying one or more layer-2 communications between the base station and the remote UE based on transitioning to the other mode on the link with the base station.

9. The method of claim 8, wherein relaying the one or more layer-2 communications between the base station and the remote UE comprises:
    relaying the one or more layer-2 communications via a packet data convergence protocol split bearer.

10. The method of claim 8, further comprising:
    performing a radio link monitoring procedure on one or more links between the remote UE and the relay UE or the relay UE and the base station; and
    initiating a radio link failure recovery procedure based at least in part on a result of performing the radio link monitoring procedure.

11. The method of claim 8, wherein identifying the remote UE comprises:
    receiving, from the remote UE, one or more requests for relaying; and
    transmitting signaling identifying an availability of the relay UE for relaying.

12. The method of claim 11, wherein the one or more requests are received during a sidelink discontinuous reception on time and the signaling identifying the availability of the relay UE is broadcasted during the sidelink discontinuous reception on time.

13. The method of claim 8, further comprising:
    remaining in the connected discontinuous reception mode on the link with the base station based at least in part on identifying the remote UE; and
    wherein transitioning from the connected discontinuous reception mode to the other mode on the link with the base station comprises:
        transitioning from the connected discontinuous reception mode to the other mode on the link with the base station based at least in part on one or more resources being configured for relay.

14. The method of claim 8, wherein transitioning from the connected discontinuous reception mode to the other mode on the link with the base station comprises:
    transitioning from the connected discontinuous reception mode to the other mode on the link with the base station based at least in part on identifying the remote UE.

15. The method of claim 8, further comprising:
transmitting information indicating identification of the remote UE to the base station.

16. The method of claim 8, further comprising:
receiving, from the base station, a reconfiguration message to establish a dedicated sidelink with the remote UE.

17. A remote user equipment (UE) for wireless communication, comprising:
a memory; and
one or more processors, coupled to the memory, configured to cause the remote UE to:
identify a relay UE that is operating in a connected discontinuous reception mode,
wherein the relay UE and the remote UE are connected to a base station,
wherein the relay UE is in the connected discontinuous reception mode on a link with the base station, and
wherein one or more links between two or more of the remote UE, the relay UE, or the base station are radio resource control configured by the base station; and
transmit one or more layer-2 communications to, or receiving the one or more layer-2 communications from, the base station via the relay UE based at least in part on the relay UE being transitioned to another mode, different from the connected discontinuous reception mode, on the link with the base station.

18. The remote UE of claim 17, wherein the one or more processors are further configured to cause the remote UE to:
perform a radio link monitoring procedure on one or more links between the remote UE and the relay UE or the remote UE and the base station; and
initiate a radio link failure recovery procedure based at least in part on a result of performing the radio link monitoring procedure.

19. The remote UE of claim 17, wherein the one or more processors, to identify the relay UE, are configured to cause the remote UE to:
transmit one or more requests for relaying; and
detect signaling identifying an availability of the relay UE for relaying.

20. The remote UE of claim 19, wherein the one or more processors, to identify the relay UE, are configured to cause the remote UE to:
transmit information indicating a detection of the relay UE for relaying.

21. The remote UE of claim 20, wherein the information includes at least one of:
a measurement report of a link between the remote UE and the relay UE, or
a UE identifier.

22. The remote UE of claim 17, wherein the one or more processors are further configured to cause the remote UE to:
receive, from the base station, a reconfiguration message to establish a dedicated sidelink with the relay UE.

23. A relay user equipment (UE) for wireless communication, comprising:
a memory; and
one or more processors, coupled to the memory, configured to cause the relay UE to:
identify, while in a connected discontinuous reception mode, a remote UE,
wherein the relay UE and the remote UE are connected to a base station,
wherein the relay UE is in the connected discontinuous reception mode on a link with the base station, and
wherein one or more links between two or more of the remote UE, the relay UE, or the base station are radio resource control configured by the base station;
transition from the connected discontinuous reception mode to another mode, different from the connected discontinuous reception mode, on the link with the base station; and
relay one or more layer-2 communications between the base station and the remote UE based on transitioning to the other mode on the link with the base station.

24. The relay UE of claim 23, wherein the one or more processors are further configured to cause the relay UE to:
perform a radio link monitoring procedure on one or more links between the remote UE and the relay UE or the relay UE and the base station; and
initiate a radio link failure recovery procedure based at least in part on a result of performing the radio link monitoring procedure.

25. The relay UE of claim 23, wherein the one or more processors, to identify the remote UE, are configured to cause the relay UE to:
receive, from the remote UE, one or more requests for relaying; and
transmit signaling identifying an availability of the relay UE for relaying.

26. The relay UE of claim 25, wherein the one or more requests are received during a sidelink discontinuous reception on time and the signaling identifying the availability of the relay UE is broadcasted during the sidelink discontinuous reception on time.

27. The relay UE of claim 23, wherein the one or more processors are further configured to cause the relay UE to:
remain in the connected discontinuous reception mode on the link with the base station based at least in part on identifying the remote UE; and
wherein the one or more processors, to transition from the connected discontinuous reception mode to the other mode on the link with the base station, are configured to cause the relay UE to:
transition from the connected discontinuous reception mode to the other mode on the link with the base station based at least in part on one or more resources being configured for relay.

28. The relay UE of claim 23, wherein the one or more processors, to transition from the connected discontinuous reception mode to the other mode on the link with the base station, are configured to cause the relay UE to:
transition from the connected discontinuous reception mode to the other mode on the link with the base station based at least in part on identifying the remote UE.

29. The relay UE of claim 23, wherein the one or more processors are further configured to cause the relay UE to:
transmit information indicating identification of the remote UE to the base station.

30. The relay UE of claim 23, wherein the one or more processors are further configured to cause the relay UE to:
receive, from the base station, a reconfiguration message to establish a dedicated sidelink with the remote UE.

* * * * *